United States Patent
Ostromoukhov et al.

[11] Patent Number: 5,422,742
[45] Date of Patent: Jun. 6, 1995

[54] METHOD AND APPARATUS FOR GENERATING HALFTONE IMAGES BY DISCRETE ONE-TO-ONE DITHER TILE ROTATION

[76] Inventors: Victor B. Ostromoukhov, Av. Jolimont 7, CH - 1005 Lausanne; Roger-David Hersch, Ch. des Planches 39, CH - 1066 Lausanne, both of Switzerland

[21] Appl. No.: 116,799

[22] Filed: Sep. 8, 1993

[51] Int. Cl.$^6$ ............................................. G06K 9/00
[52] U.S. Cl. ................................. 358/536; 358/429; 382/298
[58] Field of Search ............... 382/1, 47, 50; 358/429, 358/454, 456, 457, 459, 298, 534, 536

[56] References Cited

U.S. PATENT DOCUMENTS 4,350,996  9/1982  Rosenfeld ............................ 358/536

*Primary Examiner*—Leo H. Boudreau

[57] ABSTRACT

The invention relates to a method and apparatus for automatic high-speed generation of digital angled halftone screens, specially suited for obtaining screens approximating the irrational angles which are generally required by high-quality color reproduction. The method enables color separations to be generated which minimize Moiré effects, interferences and artifacts by applying discrete one-to-one rotations to digital halftone screens of the required period in order to reach the final screen angle. Dither tiles incorporating assemblies of the basic screen element are rotated by one-to-one discrete rotation and transformed into a new type of dither array, the scanning dither array. The scanning dither array is composed both of dither thresholds and of displacement vectors, providing the means to scan the dither array at image generation time. Several different discrete one-to-one rotation variants are proposed: a small angle rotation technique valid for a subset of rational rotation angles, a rigid band technique and an improved band technique valid for all rational rotation angles and a technique based on discrete shearing transformations. The high-quality of the so rotated dither tile is due to the fact that discrete one-to-one rotation preserves the exact number of elementary cells per screen element and their exact dither threshold values.

16 Claims, 8 Drawing Sheets

| void | void | $j_{25} = -\vec{V_1}$ | $j_{35} = -\vec{V_1}$ | void | void |
|---|---|---|---|---|---|
| $j_{04} = -\vec{V_2}$ | $j_{14} = -\vec{V_2}$ | $t_{24}$ | $t_{34}$ | $j_{44} = -\vec{V_1}$ | void |
| $j_{03} = -\vec{V_2}$ | $t_{13}$ | $t_{23}$ | $t_{33}$ | $t_{43}$ | $j_{53} = \vec{V_2}$ |
| $j_{02} = -\vec{V_2}$ | $t_{12}$ | $t_{22}$ | $t_{32}$ | $j_{42} = \vec{V_2}$ | void |
| $t_{01}$ | $t_{11}$ | $t_{21}$ | $t_{31}$ | $j_{41} = \vec{V_2}$ | void |
| $j_{00} = \vec{V_1}$ | $j_{10} = \vec{V_1}$ | $t_{20}$ | $j_{30} = \vec{V_2}$ | void | void |

FIG. 2

METHOD AND APPARATUS FOR GENERATING HALFTONE IMAGES BY DISCRETE ONE-TO-ONE DITHER TILE ROTATION

BACKGROUND OF THE INVENTION

The invention relates to a method and apparatus for generating halftone reproductions, and in particular to a method and apparatus generating at high-speed digital angled halftone screens reducing Moiré effects in multicolour halftone reproduction.

As is known by people skilled in the art, digital halftoning refers to a process which:
a) takes as input a multivalued pixmap image;
b) generates a multivalued dither threshold array having the desired screen angle, screen element period, and dot shape growth behavior determined by its threshold values;
c) scans an output image pixmap covering the surface of the input image pixmap and for each output pixel, finds its corresponding locations both in the multivalued dither array and in the input pixmap image, compares corresponding input image pixel intensity values to dither array threshold values and accordingly writes pixels of one of two possible ouput intensity levels, for example white (on) or black (off) to the output image pixmap.

The multivalued dither array generally contains the discretization of a repetitive screening function. In order to limit the required memory size, the dither array contains only one or a few periods of the basic screen elements. Such a dither array is configured so as to tile the plane.

Traditional photographic halftoning for Cyan, Magenta, Yellow colour reproduction was based on three screens, all having an identical screening frequency and each one oriented 30° away from each of the two other screen layers. In the case of 4 layers (Cyan, Magenta, Yellow, Black) the 3 darkest layers which are Cyan, Magenta and Black are arranged as mentioned above, and the fourth layer (Yellow) is placed at an angle of 15° to one of the 3 main layers.

In the graphics industry, the most common method for reproducing halftone images using bilevel printing devices, is the ordered dither method. This method consists of subdividing the whole output image space into repetitive adjoining rectangular areas—screen elements. The inside of each screen element is gradually blackened according to the gray level of the original image, thus ensuring the presence of various gray levels in the reproduction. The method used to display or print color images can be reduced to the case of black/white images if the color image is considered to be separated into three independent color planes (red-green-blue or cyan-magenta-yellow) or into four independent color planes (cyan-magenta-yellow-black), each independent color plane being treated as a single halftone black/white image. However, as regards dither orientation and frequency, printing three or four separate color planes imposes very precise constraints; consequently, the parameters of the three or four separate color planes are dependent on one another. The dependence of dither orientations and frequencies is well known to those skilled in the art and is usually expressed in terms of angles and frequencies (periods) [HUN87].

Let us also emphasize that the relationships between the yellow plane and the three other color planes (cyan, black and magenta) are far less important than the relationships between the three cyan, black and magenta color planes. For this reason, the yellow plane is often not taken into account so as to concentrate on the problems created when superposing the three most important color planes (cyan, black and magenta).

According to the method used to produce the dither threshold values, it is possible to distinguish two main families of dithering methods: (a) dispersed-dot ordered dithering and (b) clustered-dot ordered dithering. The first of these two methods, dispersed-dot ordered dithering, has quite a strong artifact which appears as a visually disturbing horizontal and vertical structure. Moreover, the reproduction curve of this dither method is particularly non uniform. This explains why method (a) is rarely used for color reproduction. On the other hand, method (b), clustered-dot ordered dithering is known as the traditional dithering technique and requires approximating at high-precision exact irrational screen angles such as 15°, 30°, or 60°. Clustered-dot ordered dithering is used in almost all high-resolution color reproduction devices as well as in many low and medium resolution devices. Despite being so common, clustered-dot ordered dither methods known in the art and applied at low and medium resolution (150–1200 dpi) produce (a) Moiré effects due to poor approximations of the required screen angle and frequencies, (b) disturbing interference patterns due to the interference between the screen element period and the output pixmap grid period, (c) variations in the screen element period creating interference patterns due to unequal numbers of elementary cells in screen elements, (d) uneven behavior of intensity levels due to different sets of threshold dither values being associated with different screen elements.

The present disclosure is the first to present a method for minimizing Moiré effects by applying discrete one-to-one rotation, producing colour separations where screen periods and angles are rendered very accurately, where the number of elementary cells per screen element is kept constant and where threshold values associated with each elementary screen element cell remain constant throughout the rotation process. The methods of this invention therefore provide colour separations having much less artifacts and interferences than previous methods known in the art. None of the methods of the art preserves in a rotated dither tile both the exact number of cells for each screen element and their exact dither threshold values, i.e. the shape growth behavior of the original non-rotated screen dot.

One method for computing an output halftone image was claimed in U.S. Pat. No. 4,350,996 (Rosenfeld). A screen function is generated, sampled and stored as an array of dither values tiling the halftone image plane. The sampling step is smaller than the output pixel step. Halftoning with rotated screens is obtained by applying inverse rotation to the current pixel output plane pointer in order to find its position in the dither plane. The method is accurate and fast, but since the "virtually" rotated dither grid represents the discretization of a screen function having an orientation and a period which differs from the output sampling grid, rotated grey ramps may show disturbing interference patterns at low resolution (200 to 1200 dpi).

The method claimed in European Patent Applications 0 427 380 A2 (Schiller), 0 498 106 A2 (Schiller), 0 499 738 A2 (Schiller, Knuth) try to avoid irregularities in grey ramps by producing correctly oriented dither tiles with screen elements each having an equal or close to equal number of elementary cells. The elementary cells within the screen element incorporate different sets of dither levels due to the varying phase relationship between the elementary cells and the dither threshold generating spot function. Interference patterns may be produced due to the interference between the screen element period and the output resolution sample period. Furthermore, the proposed methods are slow to produce dither tiles since they assign each pixel to one of the screen cells in the tile by a rather complex and slow equalization process.

The discrete one-to-one rotation method described in the present invention offers means unknown in the art for generating rotated screens which approximate irrational angles with high-precision producing much less disturbing interferences and artifacts than methods known in the art. Therefore, a carefully prepared dither tile incorporating screen elements with the desired period, initial orientation, and dither threshold values defining their screen dot shape growth behavior can be rotated by discrete one-to-one rotation and keep the desired screen element period, the number of cells per screen element and the threshold values associated with each screen element cell, thereby preserving the screen dot shape growth behavior of the original dither tile.

Since most of the disclosed one-to-one rotation techniques require only simple operations, such as additions, subtractions, shifts, replications and table accesses, rotated dither tiles may be generated much faster than by methods known in the previous art.

With discrete one-to-one rotation very high quality results at resolutions between 200 and 800 dpi are obtained for traditional screens having relative orientations of 0°, 30°, and 60°.

SUMMARY OF THE INVENTION

The invention relates to a method and apparatus for automatic high-speed generation of digital angled halftone screens, specially suited for obtaining screens approximating the irrational angles which are generally required by high-quality colour reproduction.

The method enables us to define for each dither layer the initial and final screen angles, the final screen period and the rotation angle for generating colour separations which minimize Moiré effects. First, expanded dither tiles of a size enabling discrete one-to-one rotation are generated by assembling digital halftone screen elements of the required period, initial angle and dither levels defining the screen dot growth behavior. The desired final orientation is reached by applying to the tile one or several discrete one-to-one rotations. After each rotation, the current tile may have to be replaced by an equivalent tile paving the plane and enabling the next discrete one-to-one rotation step. The resulting rotated tile may be transformed into a new type of dither array, the scanning dither array, which is composed both of dither threshold values and of displacement vectors, providing the means for efficiently scanning the dither array at image generation time.

Four different discrete one-to-one rotation variants are disclosed: a small angle rotation technique valid for a subset of rational rotation angles, a rigid band technique and an improved band technique valid for all rational rotation angles as well as a technique based on discrete shearing transformations.

The present disclosure is the first to present a method for generating colour separations minimizing Moiré patterns by applying discrete one-to-one rotation, producing colour separations where screen periods and angles are rendered very accurately, where the number of screen cells per screen element is kept constant and where threshold values associated with each screen element cell remain constant throughout the rotation process. The invented method therefore provides colour separations having much less artifacts and interferences than previous methods known in the art.

Since discrete one-to-one rotation enables screen tiles generated by any existing or new method to be rotated, it provides a new range of solutions for obtaining digital angled halftone screens. In this range of solutions, very good solutions can be found for generating three digital angled halftone screens, each 30° away from each other, as known from traditional photographic colour screening techniques. Further solutions minimizing Moiré effects may be obtained by halftone screens whose first order frequency component vectors sum up to zero. Since most of the proposed discrete one-to-one rotation variants can be accomplished by simple and incremental operations such as additions, subtractions, shifts, replications and table accesses, discrete one-to-one rotation is capable of generating angled halftone screens at high-speed.

BRIEF DESCRIPTION OF THE DRAWINGS

The characteristics and advantages of the invention will be described in the following description referring to the enclosed drawings and in which:

FIG. 2 shows an example of a scanning dither array corresponding to the discrete tile shown in FIG. 1;

FIG. 7a illustrates a non-rotated rigid band and FIG. 7b the corresponding rotated band with its associated cell centers;

FIG. 8a illustrates the two non-rotated bands and FIG. 8b the two corresponding rotated bands, their associated cell centers and their band replication vectors;

PREFERRED EMBODIMENTS OF THE INVENTION

Figure 1:
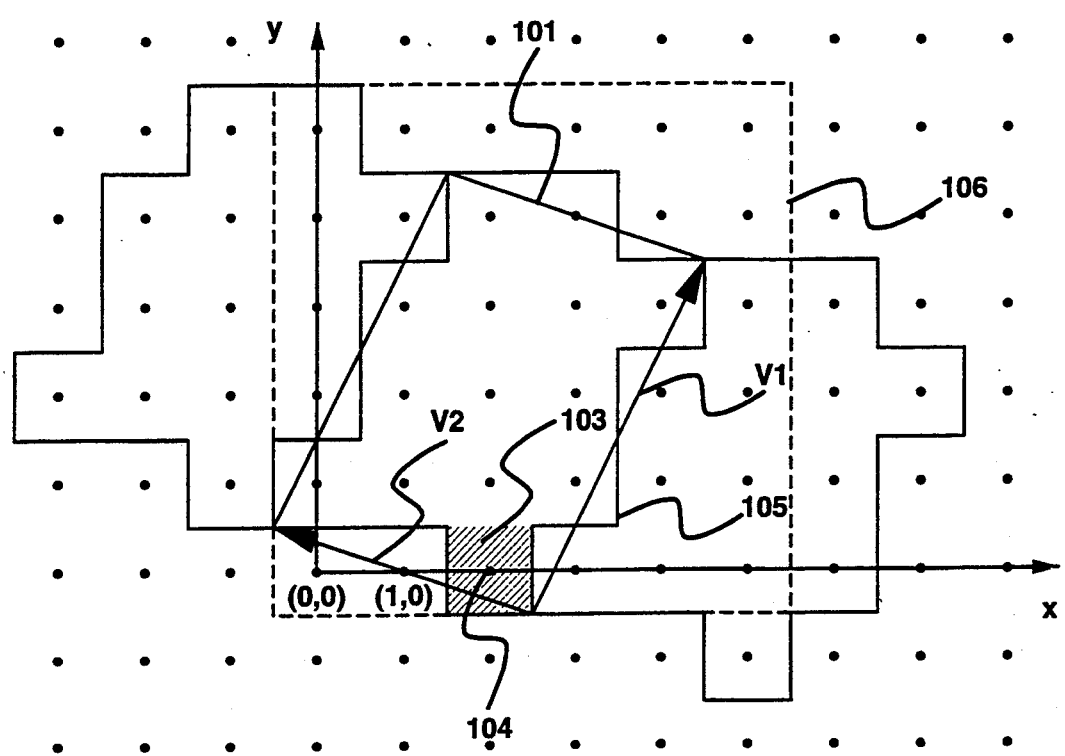
FIG. 1 shows an example of a discrete tile paving the plane, its continuous borders 101 and the circumscribing rectangle 106 defining the size of the corresponding scanning dither array.

The present invention concerns a method and apparatus for creating high-precision digital angled halftone screens minimizing Moiré effects and interferences in multicolour reproduction.

In the present invention, discrete dither tiles having in each elementary cell one dither threshold value will be generated by discrete one-to-one rotation as disclosed below. Generally, these discrete tiles will be of parallelogram shape. In some cases, they may however have more complex shapes such as a hexagonal or even dragon-like shapes. The section on scanning dither array construction and use discloses how to build a scanning dither array from discrete tiles and how to scan such an array during the output image pixmap scanning process.

In the following description, the term parallelogram shape will generally be used to describe 4-sided screen elements or tiles having two pairs of parallel sides. Squares and rectangles are special cases of parallelogram shapes. A discrete tile of parallelogram shape is formed by the discretization of a continuous parallelogram (see 101 in FIG. 1), which consists of selecting the cells 103, whose cell centers 104 are interior to the generating parallelogram shape. The continuous shape used to synthesize the discrete screen element or tile is called the generating shape. Rectangular and quadratic shaped discrete tiles are special cases of parallelogram shaped discrete tiles.

In the following description, it is assumed that the dither tile or dither threshold array is composed of elementary cells (see for example 103 in FIG. 1) and that the output image is composed of pixels.

Scanning dither array construction and use. In the present invention, rather large discrete dither tiles are generated by discrete one-to-one rotation techniques. The disclosed scanning dither array technique distinguishes itself from previous art dither array techniques by the fact that the scanning dither array (see FIG. 2) contains both threshold values 201 and displacement vectors 202 used for output image scanning at output image generation time.

Let us assume that a given discrete tile called the original tile as shown in FIG. 1 paves the dither plane. Moving from elementary cell to elementary cell in the dither plane consists in moving from cell to cell either in the original tile or in a replication of the original tile. Such displacements in the dither plane correspond to displacements from cell to cell within the original tile.

The scanning dither array is an array containing all cells interior to the bounding-box rectangle circumscribed to the original discrete dither tile, plus an additional cell row and an additional cell column at the positive column and row extremities, as shown in FIG. 1, 106. Entries in the array corresponding to cells of the original discrete dither tile contain their respective threshold values. Let column j be the column of the first cell in row y=0 which belongs to the original discrete dither tile (for example 203). Entries 0 to j−1 in the first row y=0 contain a displacement vector 204 indicating the required displacement from the current cell to reach the corresponding cell inside the original discrete dither tile. Similarly, let row i be the row of the first cell in column x=0 which belongs to the original discrete dither tile (for example 205). Entries 0 to i−1 in the first column x=0 contain a displacement vector indicating the required displacement from the current cell to reach the corresponding cell inside the original discrete dither tile. In each array row, the cell (for example 207) following the last cell inside the original discrete dither tile contains a displacement vector indicating the required displacement from the current cell to reach the corresponding cell inside the original discrete dither tile. In each array column, the cell (for example 208) following the last cell inside the original discrete dither tile contains a displacement vector indicating the required displacement from the current cell to reach the corresponding cell inside the original discrete dither tile. The remaining entries of the scanning dither array are marked as void. FIG. 2 shows as an example a scanning dither array which is constructed from the tile shown in FIG. 1.

The dither halftone process scans the output image pixmap, starting at scanline y=0, pixel x=0 and proceeds by scanning pixels from location x=0 to x=$x_{max}$−1 and from scanline y=0 to scanline y=$y_{max}$−1, with $x_{max}$ and $y_{max}$ being respectively the number of pixels per scanline and the number of scanlines in the output image pixmap. Scanning the output image pixmap corresponds to scanning the dither plane, which in turn corresponds to scanning the scanning dither array.

The output image pixmap pointer (px, py) starts at location (O,O), which corresponds to scanning dither array entry (O,O) pointed by scanning dither array pointer (sx, sy). The scanning dither array contains either a threshold value, or a displacement vector. In the case of a displacement vector (dx, dy), the scanning dither array pointer is updated (sx, sy):=(sx, sy)+(dx, dy) and the threshold value is fetched. A copy of the scanning dither array pointer is copied into the current starting row pointer (rx, ry):=(sx, sy). When the output image pixmap pointer (px, py) is incremented to its next horizontal location px:=px+1, the scanning dither array pointer (sx, sy) is also incremented to its next location sx:=sx+1. At this location, there is either a threshold value or a displacement vector. In the case of a displacement vector (dx, dy), scanning dither array pointer (sx, sy) is updated (sx, sy):=(sx, sy)+(dx, dy) and the threshold value is fetched. This process repeats itself until the end of the current scanline. At the new scanline, output image pixmap pointer is updated (x:=0, y:=y+1). The ordinate of the current starting row pointer is incremented (rx, ry):=(rx, ry+1) and the scanning dither array pointer (sx, sy) is initialized (sx, sy):=(rx, ry). The outpout image scanline is scanned as in the previous scanline and the new scanline is processed as before. After having processed all scanlines, all dither values have been obtained and used to generate the halftoned image.

Figure 3:
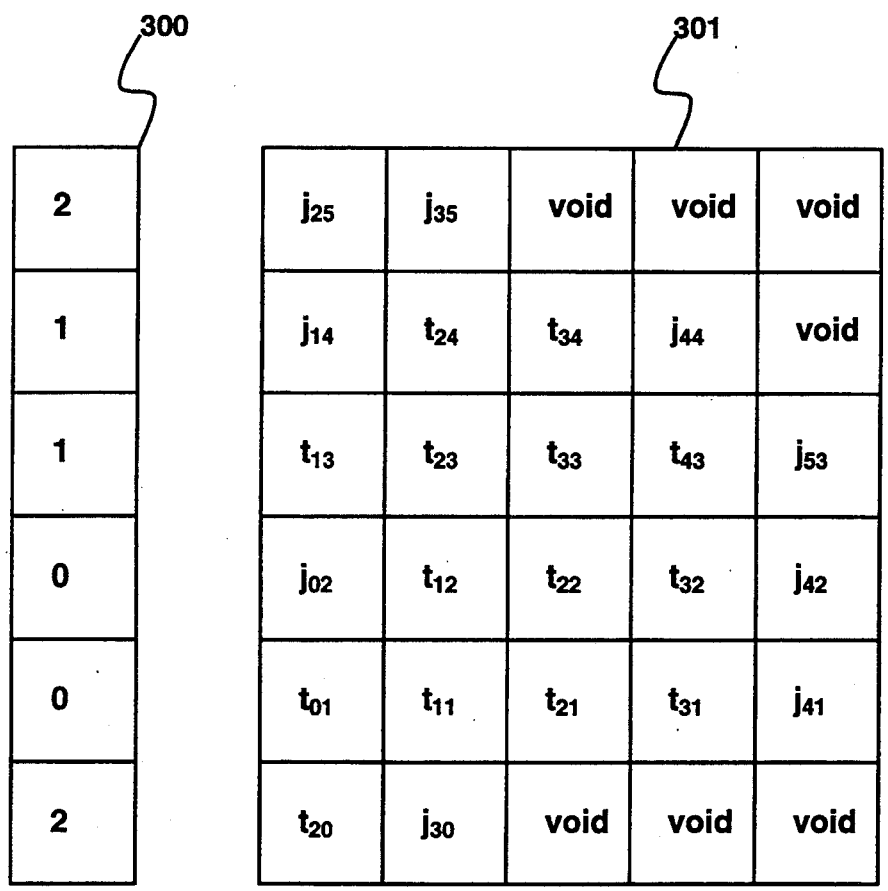
FIG. 3 shows an example of a reduced scanning dither array 301 with its associated displacement vector 300.

In the case where the discrete dither tile is rather large and due to its orientation and shape occupies only a subset of entries in the scanning dither array, the space required to store the scanning dither array can be reduced in the following way. A reduced scanning dither array is built, with its first row element (x=0,y) in each row containing the first non-void cell of the scanning dither array. A horizontal positioning vector 300 contains for each row one number indicating the position of the first row element of the reduced scanning dither array in the scanning dither array, as shown in the example of FIG. 3. Without loss of generality, the origin of the output image coordinate system can be displaced to a location inside the original discrete dither tile. In this way, the width of the reduced scanning dither array is reduced to a size close to the maximal width of the discrete tile in the horizontal direction. FIG. 3 shows the reduced scanning dither array corresponding to the discrete tile shown in FIG. 1. In the following description of the method and apparatus, the terms scanning dither array becomes the general term which may refer to both the scanning dither array or the reduced scanning dither array.

The scanning dither array can be used to store not only discrete dither tiles of parallelogram shape, but also dither tiles of arbitrary shape which pave the dither plane. Thus the disclosed scanning dither array and reduced scanning dither array are general-purpose techniques for storing and scanning discrete dither tiles paving the plane.

Exact solutions which minimize the Moiré effect. The Moiré effect is a phenomenon which appears when two or more dithered layers are superposed, for example when the four color planes—yellow, cyan, black and magenta—are superposed in the quadrichromia printing process. The Moiré effect consists of visible interference fringes whose frequencies are not present in the original dithered layer. Usually, this phenomenon is considered undesirable; the aim is to minimize it if it cannot be eliminated.

Figure 4A:
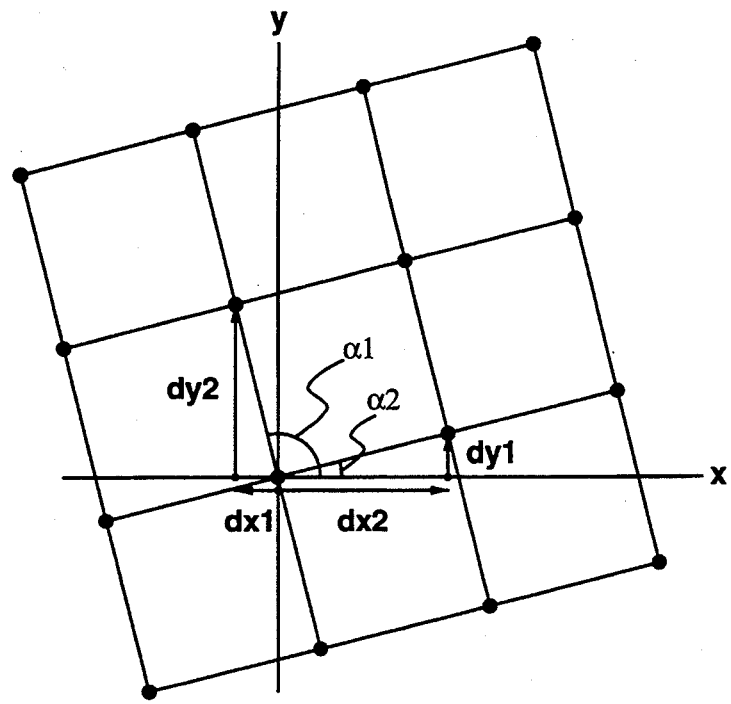
FIGS. 4a and 4b show an example of the relation between the screen element parameters in the image domain (FIG. 4a) and their representation in the frequency domain (FIG. 4b)
Figure 4B:
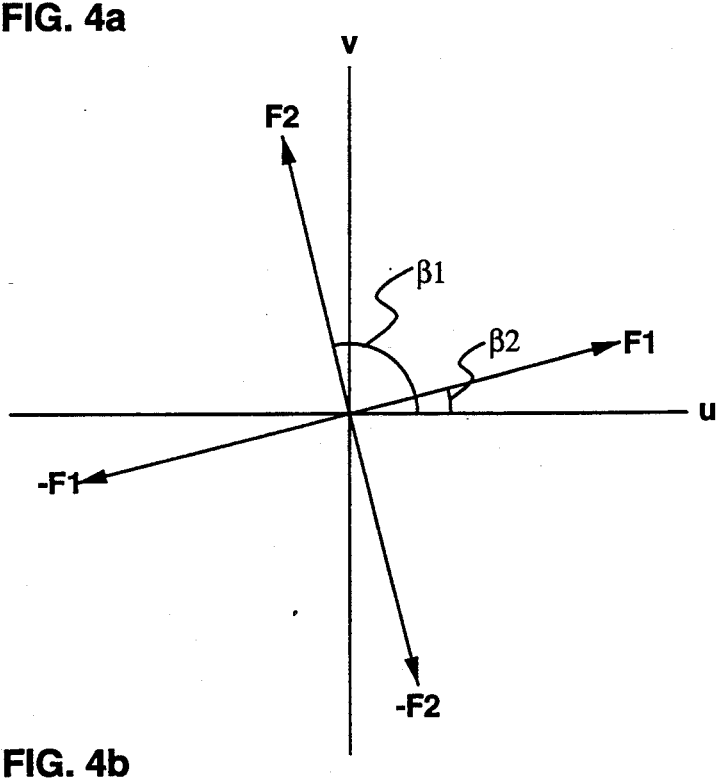

The following description formulates a simple principle for minimizing the Moiré effect when several dithered layers are superposed. Let us consider the case of the 3 superposed dithered layers corresponding to the 3 separate cyan, magenta and black color separations in the four-color reproduction process (as mentioned above, the fourth layer, corresponding to the yellow separation does not need to be taken into account). Superposing the three dithered layers for given input image intensity levels can be considered to be a binary multiplication of values of the elementary cells which constitute the three dithered images. Multiplying in the image domain corresponds to a convolution in the frequency domain [BRA86]. Each of the three dithered layers is characterized by its period and its dither orientation. FIG. 4 shows an example of the relation between the screen elements in the image domain (FIG. 4a) and their representation in the frequency domain (FIG. 4b). In the example of FIG. 4a, the grid is a square one, i.e., $$dx_1 = dy_2; \quad dx_2 = -dy_1$$

$$\alpha_2 = \alpha_1 + \pi/2 \quad (1)$$

In the frequency domain, let us consider only the locations of the first order frequency component of the screen function which are shown in the example of FIG. 4b as frequency location vectors $\vec{F_1}$, $-\vec{F_1}$, $\vec{F_2}$ and $-\vec{F_2}$. Further terms of the Fourier series development of the screen function are ignored. The orientation of vectors $\vec{F_1}$ and $\vec{F_2}$ corresponds to the orientation of the screen element grid, i.e. for a square grid $$\alpha_1 = \beta_1; \quad \alpha_2 = \beta_2;$$

$$\beta_2 = \beta_1 + \pi/2. \quad (2)$$

The length of frequency location vectors $\vec{F_1}$ and $\vec{F_2}$ is inversely proportional to the dither or screen period. For a square screen element grid:

$$\|\vec{F_1}\| = \|\vec{F_2}\| = \frac{1}{\sqrt{dx_1^2 + dy_1^2}} \quad (3)$$

Let us consider the general case where $\vec{F_1}^{(i)}$, $-\vec{F_1}^{(i)}$, $\vec{F_2}^{(i)}$, $-\vec{F_2}^{(i)}$ are vectors which determine the location of the first-order frequencies of the i-th dithered layer, where i=1,2,3. Let $P_1$ be the set of vectors $\{\vec{F_1}^{(1)}, -\vec{F_1}^{(1)}, \vec{F_2}^{(1)}, -\vec{F_2}^{(1)}\}$; $P_2$ the set of vectors $\{\vec{F_1}^{(2)}, -\vec{F_1}^{(2)}, \vec{F_2}^{(2)}, -\vec{F_2}^{(2)}\}$; $P_3$ vectors the set of vectors $\{\vec{F_1}^{(3)}, -\vec{F_1}^{(3)}, \vec{F_2}^{(3)}, -\vec{F_2}^{(3)}\}$. The easiest way to minimize the Moiré effect when superposing three dithered layers is to require that the vectorial sum of vectors $\vec{Q_1}$, $\vec{Q_2}$, and $\vec{Q_3}$ be equal to zero:

$$\vec{Q_1} + \vec{Q_2} + \vec{Q_3} = 0 \quad (4)$$

where $\vec{Q_1}$ is one of the vectors belonging to set $P_1$, $\vec{Q_2}$ is one of the vectors belonging to set $P_2$, $\vec{Q_3}$ is one of the vectors belonging to set $P_3$, and where $\vec{Q_1} \neq \vec{Q_2}$; $\vec{Q_2} \neq \vec{Q_3}$; $\vec{Q_1} \neq \vec{Q_3}$.

It is easy to check that the conventional dithering methods, where screens have identical periods and angles which differ by 30° (15°, 45° and 75°) correspond exactly to the rule defined in formula (4).

Equation (4) can be used to compute a final angle for each of the screen layers. A dither tile with screen elements having a given initial angle is rotated by discrete one-to-one rotation in order to reach the final screen angle.

Principle of discrete one-to-one rotation. Discrete rotation of a quadratic or rectangular elementary cell grid is defined as a mapping of the cell grid into itself. It differs from geometric rotation in the Euclidian plane by the fact that after application of a discrete rotation to a given discrete shape, quadratic or rectangular elementary cells forming the rotated shape keep the same orientation as the cells of the original shape.

Let t be a discrete one-to-one transformation of the discrete cell plane upon itself $$(w'_x, w'_y) = t(w_x, w_y) \quad (5)$$

where the cell centers' two-dimensional coordinates $(w'_x, w'_y)$ and $(w_x, w_y)$ belong to the set of integers, i.e. $w'_x, w'_y, w_x, w_y \in \mathbb{Z}^2$. To simplify the notation, a cell with coordinates $(w_x, w_y)$ will be noted as w.

The discrete one-to-one transformation $\Gamma_\theta$ is known as a discrete one-to-one rotation at angle $\theta$ of the plane around the origin if, after transformation $w' = \Gamma_\theta(w)$, the integer coordinates of the center of cell $w'$ are not very different from the real number coordinates of the center of cell $w''$ obtained by the exact geometric rotation of cell center w at angle $\theta$ around the origin:

$$\|w' - w''\| < \epsilon \quad (6)$$

where $\epsilon$ is a (small) predefined constant and $w''$ the result of an exact rotation of cell center w at angle $\theta$ characterized by the transformation matrix A:

$$w'' = Aw \quad (7)$$

where $$A = \begin{pmatrix} \cos\theta & -\sin\theta \\ \sin\theta & \cos\theta \end{pmatrix}. \quad (8)$$

In the general case, we can assume that there is an infinite number of discrete one-to-one rotations $\Gamma_\theta$ to which satisfy the above definition. As preferred embodiments, we describe four discrete one-to-one rotation variants applicable to color reproduction: a small angle rotation technique valid for a subset of rational rotation angles, a rigid band technique and an improved band technique valid for all rational rotation angles and a technique based on discrete shearing transformations. Further discrete one-to-one rotation techniques may exist. The present disclosure especially concerns the principle of discrete one-to-one rotations applied to dither threshold value tiles in order to approximate as closely as possible desired screen orientations and periods of the dither layers.

Combination of several discrete one-to-one rotations $\Gamma_{\theta_1}$ also results in a discrete one-to-one rotation. Identity transformation defined by angle $\theta = 0$ is also a discrete one-to-one rotation.

Pythagorean triangles. Most techniques described in the present disclosure use Pythagorean triangles or Pythagorean numbers (triplets). Pythagorean numbers (triplets) a, b and c and corresponding Pythagorean triangles can be defined as integers a, b and c which satisfy the Diophantine equation $$a^2 + b^2 = c^2. \tag{9}$$

The angle $\theta = \arctan(b/a)$ is called a rational angle when a and b fulfill condition (9).

All basic solutions, i.e., those for which a, b and c do not have a common divisor, can be derived from coprime integers $m > 0$ and $n > 0$, at least one of each must be even, as follows:

$$a = 2mn$$
$$b = m^2 - n^2$$
$$c = m^2 + n^2. \tag{10}$$

The inverse problem for finding integers n and m from Pythagorean numbers a, b and c can be solved as follows:

$$m = \frac{(c - \sqrt{c-a}\sqrt{c+a})\sqrt{c+\sqrt{c-a}\sqrt{c+a}}}{\sqrt{2}\, a} \tag{11}$$

$$n = \frac{\sqrt{c + \sqrt{c-a}\sqrt{c+a}}}{\sqrt{2}}$$

Let us describe a simple algorithm for finding a Pythagorean triangle with sides a, b and c whose smallest angle $\theta$ approximates a given angle $\alpha$, $45° \geq \alpha > 0$. We are interested in solutions within a given radius R, i.e. we are looking for solutions a, b and $c < R$:

step 1: calculate $m_{max}$ and $n_{max}$ by applying the formula (11) and replacing c by R and a by R cos $\alpha$.

$$m_{max} = Round(m) + 1$$
$$n_{max} = Round(n) + 1$$

step 2: for every combination (m, n), where m is an integer in the range [1 ... $m_{max}$] and n is an integer in the range [1 ... $n_{max}$], calculate Pythagorean triplets (a, b, c) according to (10). Keep the triplet (a, b, c) which produces the angle $\theta$ closest to $\alpha$.

It can be verified that for any rational or irrational angle $\alpha$, $45° \geq \alpha > 0$ one can find a Pythagorean triangle whose smallest angle $\theta$ approximates $\alpha$ with any desired accuracy, by choosing the range value R to be big enough. On the other hand, a very big range R and consequently very big Pythagorean triplets (a, b, c) will restrict the practical implementation of the disclosed method. One will therefore look for a trade-off between the desired accuracy and the size of the Pythagorean triangle.

Small angle discrete one-to-one rotation. Discrete one-to-one rotation of the plane using the small angle technique consists of applying a geometric rotation defined by formulae (7), (8) to the cell centers and subsequently applying a Round discretization function. If angle $\theta$ is a rational angle, i.e. $\tan\theta = b/a$ and if a, b and c are Pythagorean numbers, then, using equations (7) and (8) one obtains $$x' = Round\left(\frac{a*x - b*y}{c}\right) \tag{12}$$

$$y' = Round\left(\frac{b*x + a*y}{c}\right).$$

It is possible to demonstate that the transformation $\Gamma$ described in equations (12) is one-to-one if $$c = a + 1; \; a > b \tag{13}$$

or $$c = b + 1; \; a < b. \tag{14}$$

The following table gives some examples of discrete small angle one-to-one rotations:

| a | b | c | $\theta$ (deg) |
|---|---|---|---|
| 4 | 3 | 5 | 36.870 |
| 12 | 5 | 13 | 22.629 |
| 24 | 7 | 25 | 16.260 |
| 40 | 9 | 41 | 12.680 |
| 60 | 11 | 61 | 10.389 |
| 2 mn | $m^2 - n^2$ | $m^2 + n^2$ | arctan(b/a) | where m and n are coprime integers and $2mn = m^2 + n^2 + 1$.

Small angle discrete one-to-one rotation can be used to rotate a dither tile having a parallelogram or rectangular shape and tiling the plane. Let $\vec{v1}$ be the vector characterizing one side of the parallelogram tile and $\vec{v2}$ characterizing the second side of the parallelogram tile. A small angle discrete one-to-one rotation by an angle $\theta$, where $\tan\theta = b/a$ and $a^2 + b^2 = c^2$ requires rotating an ef-tile comprising the original tile as well as replications of the original parallelogram tile. The resulting ef-tile's size is given by its characterizing vectors $$\vec{w1} = e * \frac{\vec{v1}}{|\vec{v1}|},$$

$$\vec{w2} = f * \frac{\vec{v2}}{|\vec{v2}|},$$

where e and f are obtained by applying the least common multiple operator $$e = LCM(c, |\vec{v1}|)$$

$$f = LCM(c, |\vec{v2}|).$$

A small angle discrete one-to-one rotation of the ef-tile by angle $\theta$ results in a rotated ef-tile paving the plane. The resulting discrete tile paving the plane may be transformed by scanning dither array construction into a scanning dither array used for producing the output halftone image. Small angle discrete one-to-one dither tile rotation is a fast process since it can be implemented by incremental techniques known in the art.

Figure 7A:
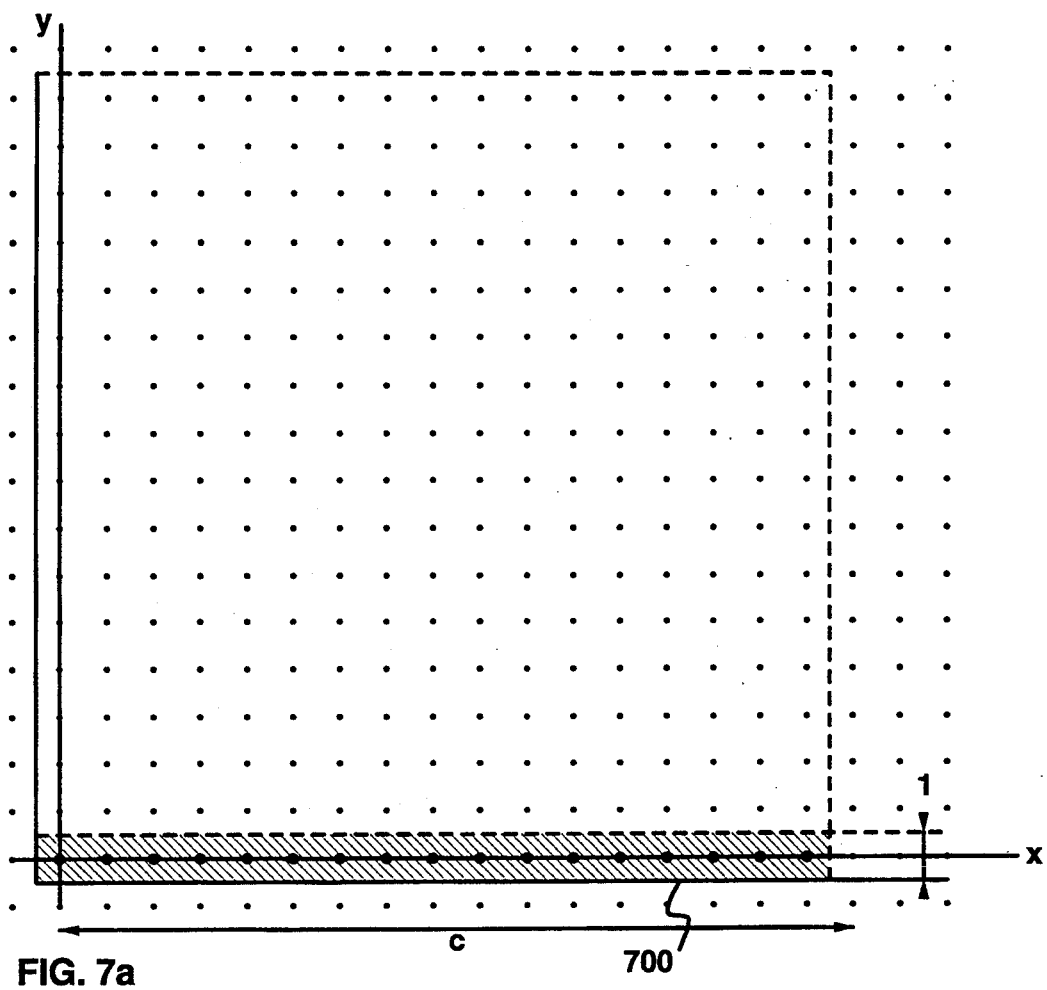
FIGS. 7a and 7b show an example of the rigid band discrete one-to-one rotation technique, where
Figure 7B:
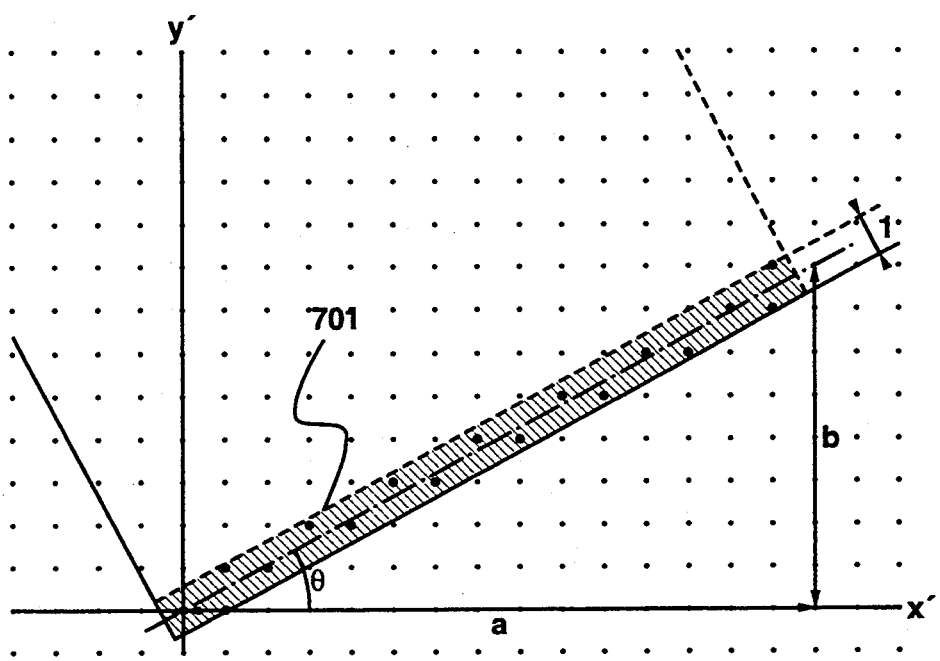

Rigid band discrete one-to-one rotation. Rigid band discrete one-to-one rotation is a further discrete one-to-one rotation technique, which works by subdividing the original non-rotated tile into rigid bands, as shown in FIG. 7. In the case of a quadratic horizontally-oriented original tile, with side c, where c is the hypothenuse of the Pythagorean triangle defining rotation angle $\theta$ as stated in formula (9), rigid band rotation requires the construction of a unit-wide rectangular band of length c, symmetric to axis x, as shown by 700 in FIG. 7a. When the borders of the rectangular band are geometrically rotated as defined in formulae (7) and (8), one obtains a continuous rotated rectangular band, as shown in FIG. 7b, 701. One can show that if $\theta$ is a rational angle, then there will be exactly c cell centers in the rotated continuous band, which are illustrated by the bold dots in FIG. 7b. The elementary c cells belonging to the rigid band before the rotation and the c cells belonging to the rigid band after the rotation can be ordered and put in relation with one another by a one-to-one function.

Figure 8A:
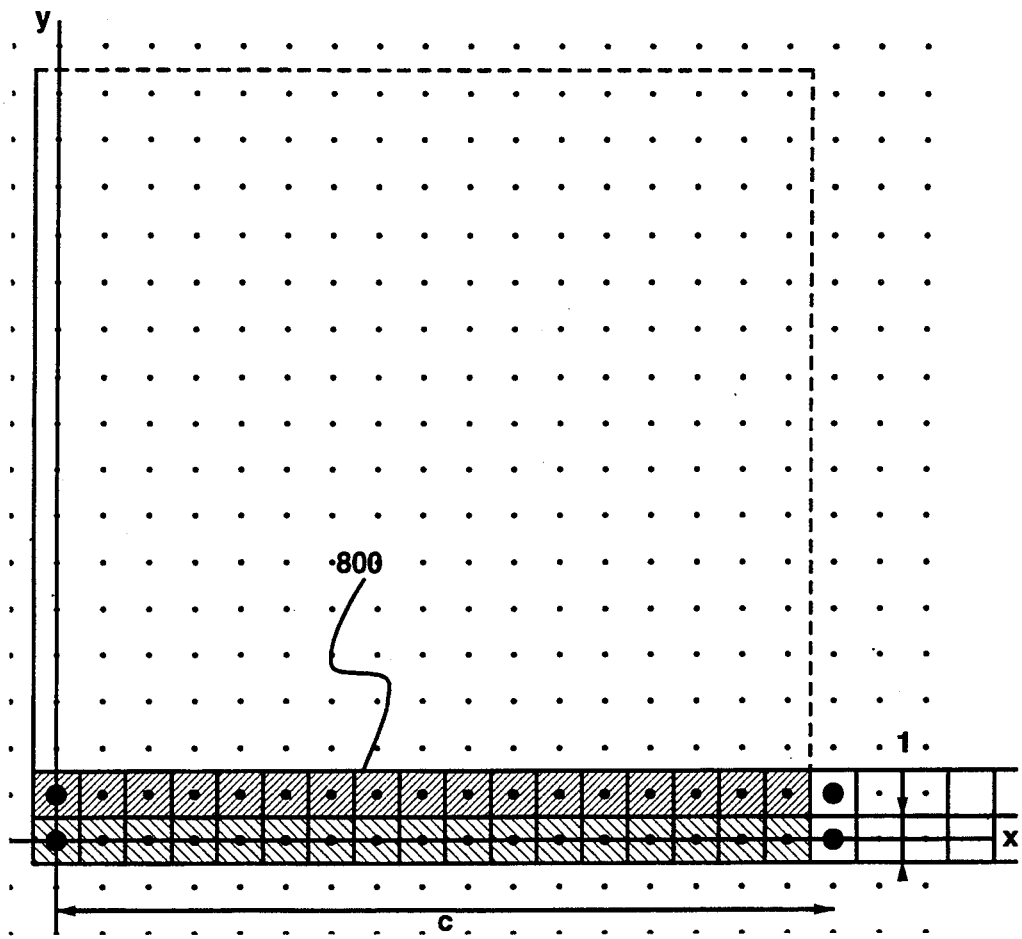
FIGS. 8a and 8b show an example of the disposition of two neighbour rigid bands, where

In a similar way one can built in the original tile a second continuous band, identical to the first one, but displaced from the first band by one unit in the vertical direction as shown in FIG. 8a, 800. The rotated second continuous band border shown by 801 in FIG. 8b also contains c cell centers. Let us consider the discrete band made up of the cells belonging to the rotated continous band as being able to wrap around its extremities. One can show that, if a translation defined by replication vector $\vec{z}$ is applied to one discrete band, it becomes congruent with the second discrete band. Let us call this property the discrete translated band congruence.

In order to find the replication vector $\vec{z}=(x_z, y_z)$, where $x_z, y_z \in \mathbb{Z}^2$, let us consider the continuous rotation function f(u, v) with rotation angle $\theta=\arctan(b/a)$ used to rotate the continuous band borders:

$$x = \frac{a}{c} u - \frac{b}{c} v \quad (15)$$

$$y = \frac{b}{c} u + \frac{a}{c} v.$$

One can show that if one cell center of a cell belonging to the first rotated discrete band $B_{abc}$ 803 has integer x and y coordinates, then there will be also one cell center belonging to one cell of the second rotated discrete band $B_{abc}$ 804 with integer x and y coordinates. By construction, rotated cell center $(0,0)=f(0,0)$ of cell 803 with $u=0$ belonging to the first band has integer coordinates. Rotated cell center $(x_z,y_z)=f(u_z,1)$ belonging to a cell of the second band is to be found.

The algorithm for finding replication vector $\vec{z}$ is as follows:

for every integer u between O and $c-1$, calculate cell center (x,y) given by function f(u,1) according to (15). If both x and y coordinates are integer numbers, memorize current u as $u_z$ and current (x,y) as $(x_z,y_z)$ and break the loop. According to (15), the exact criterion for deciding if both x and y coordinates of the cell f(u, 1) are integer can be formulated as follows:

$$GCD(-b+ua,c)=c \text{ AND } GCD(a+ub,c)=c \quad (16)$$

Since for a square tile of side c we have $c^2$ different threshold levels, c successive rotated bands have to be generated in order to obtain a rotated discrete tile paving the plane.

Once the cells of the first discrete rotated band have been numbered, the cells of the second and the following bands can be found and numbered by making use of the discrete translated band congruence.

The criterion specifying if integer cell center $(x_i,y_i)$ belongs to the discrete band $B_{abc}$ can be formulated as follows: the signed distance d between the cell center $(x_i,y_i)$ and the axis of the discrete band $B_{abc}$ satisfies the condition $$\tfrac{1}{2} > d \geq -\tfrac{1}{2} \quad (17)$$

where the signed distance d can be calculated by a scalar product as follows $$d = \begin{pmatrix} x_i \\ y_i \end{pmatrix} \begin{pmatrix} -b/c \\ a/c \end{pmatrix}$$

with (a/c,b/c) being the x and y coordinates of the unit vector in the direction parallel to the axis of the band $B_{abc}$. Equation (18) gives the definitive condition for deciding if integer cell center $(x_i,y_i)$ belongs to the discrete band $B_{abc}$:

$$c > 2ay_i - 2bx_i \geq -c. \quad (18)$$

Figure 8B:
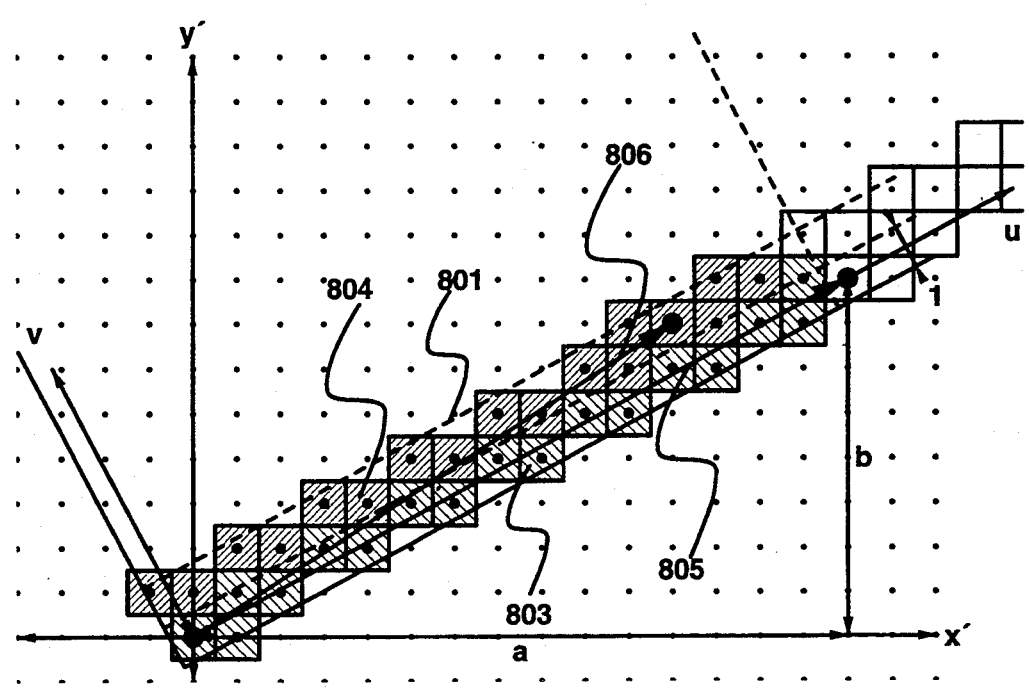
Figure 9:
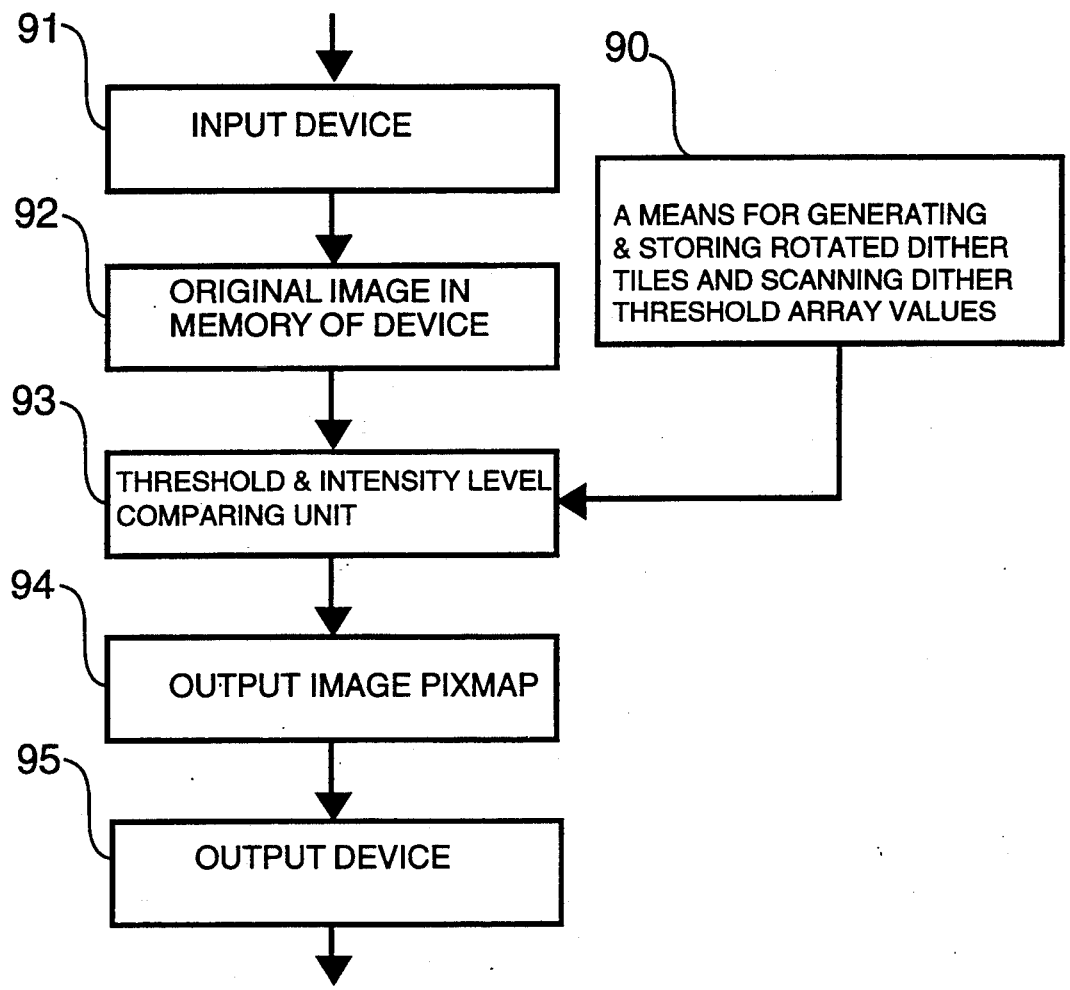
FIG. 9 shows an embodiment of an apparatus operable for producing colour halftone separations by discrete one-to-one rotation.

Let us describe in detail the numbering process of all cells inside the rigid band $B_{abc}$ shown in FIG. 8b. The process requires walking through a specific set of integer cell centers and selecting among all candidates the cells which satisfy the criterion of belonging to the discrete band $B_{abc}$.

During the first step, we affect the zero (0, 0) cell to the current cell $(x_{cur},y_{cur})$. This cell satisfies criterion (17) and hence it belongs to the discrete band $B_{abc}$.

The second step is subdivided into several substeps:
try cell $(x,y)=(x_{cur},y_{cur}+1)$ and apply to it criterion (17); if cell (x,y) belongs to the discrete band $B_{abc}$, cell (x,y) is added to the list of cells which belong to the discrete band and value $(x_{cur},y_{cur}+1)$ is affected to the current cell $(x_{cur},y_{cur})$;

otherwise, try cell $(x',y')=(x_{cur}+1,y_{cur})$ and apply to it criterion (17); if cell (x',y') belongs to the discrete band $B_{abc}$, cell (x',y') is added to the list of cells which belong to the discrete band and value $(x_{cur}+1, y_{cur})$ is affected to the current cell $(x_{cur}, y_{cur})$;

otherwise, try cell $(x'',y'')=(x_{cur}+1,y_{cur}+1)$ and apply to it criterion (17); if cell (x'',y'') belongs to the discrete band $B_{abc}$, cell (x'',y'') is added to the list of cells which belong to the discrete band and value $(x_{cur}+1, y_{cur}+1)$ is affected to the current cell $(x_{cur}, y_{cur})$.

The second step is iteratively repeated until the list of integer cells which belong to the discrete band $B_{abc}$ contains exactly c elements.

Once all unit-wide bands composing the non-rotated tile have been rotated, one obtains the resulting discrete tile where all elementary cells are mapped by a one-to-one mapping to the non-rotated tile's cells. The threshold values of the elementary cells in the rotated tile are assigned the threshold values of the corresponding cells in the original tile. The resulting discrete tile paving the plane can therefore be transformed by the scanning dither array construction into a scanning dither array used for producing the output halftone image.

In the case of an intial rectangular tile given by integer sides u and v and containing u*v elementary cells, the tile must be expanded both in the x and in the y directions in order to obtain for the length of each side a multiple of c, the hypothenuse of the Pythagorean triangle defining rotation angle $\theta$. This leads to an expanded ef-tile with sides $e_u$ in the x direction and $f_v$ in the y direction:

$$e_u = LCM(u,c)$$

$$f_v = LCM(v,c)$$

where LCM is the least common multiple operator.

Rigid band discrete rotation is applied to the ef-tile in the same way as described above. $f_v$ unit-wide bands of length $e_u$ are generated, rotated, and discretized and numbered. To each cell of the rotated bands corresponds one cell in the non-rotated ef-tile. Threshold values of cells belonging to the non-rotated ef-tile are assigned to cells of the rotated bands. The set of cells belonging to the rotated bands form a discrete tile paving the plane. This discrete tile may be converted into a scanning dither array for subsequent generation of the halftoned output image.

Since rigid band discrete rotation can be applied to any rectangular tile paving the plane, it can also be applied to any tile which is transformable into a rectangular tile. Discrete one-to-one rotation of tiles by the rigid band method is a fast process, since only one rotated discrete band needs to be constructed. All other bands are obtained by replications of said constructed band.

Improved band discrete one-to-one rotation. The discrete rigid band $B_{abc}$ described in the previous section possesses two important properties which make the discrete one-to-one rotation possible:

Property P1—$B_{abc}$ contains exactly c cells,
Property P2—$B_{abc}$ tiles the plane with replications obtained by applying two replication vectors $$\vec{v}_1 = \begin{pmatrix} a \\ b \end{pmatrix}$$

shown as 805 in FIG. 8b and $$\vec{v}_2 = \begin{pmatrix} x_z \\ x_z \end{pmatrix}$$

shown as 806 in FIG. 8b.

It is nevertheless possible that maximal error factor $\epsilon$ between exact rotation by angle $\theta = \arctan(b/a)$ and the rigid band discrete one-to-one rotation as defined in (6) might be too large. One may conceive other discrete bands which possess the same two properties P1 and P2 as discrete rigid band $B_{abc}$, without satisfying criterion (17), i.e., without lying between two rigid boundaries. Let us call such a band an improved band $IB_{abc}$. The improved band $IB_{abc}$ may have either its maximal error $\epsilon$ or its mean-square error $\epsilon_m$ which behaves better than the error produced by rigid band $B_{abc}$.

In the present disclosure, we give one embodiment of a possible improvement of the discrete rigid band $B_{abc}$ in order to obtain the improved band $IB_{abc}$ according to a possible error criterion, which is the mean-square error $\epsilon_m$ between exact continuous and discrete rotations.

The process by which the improved band $IB_{abc}$ is generated consists of successively trying to remove one cell from the rigid band and replacing it at another location by a cell from a neighbouring band. If the replacement leads to a lower mean square error, then the exchanged cells are kept. This process iterates by trying to replace all successive cells. Since at each exchange all the cells are renumbered, the whole process iterates a few times until it becomes stable.

The process starts with rotated discrete rigid band $B_{abc}$ and can be subdivided into following steps:

step 1: delete the first member with coordinates $(x_i, y_i) = (0, 0)$ from the discrete rigid band $B_{abc}$;

step 2: add anew member with coordinates $(x'_i, y'_i) = ((x_i - x_z) MOD \ c, (y_i - y_z) MOD \ c)$ to the discrete rigid band $B_{abc}$. This operation consists of displacing one cell from a lower band to the current band in order to obtain a new band $N_{abc}$. The so obtained new band $N_{abc}$ possesses both P1 and P2 properties. After this displacement operation, all cells inside the band $N_{abc}$ are renumbered according to the numbering techique described in the previous section. Calculate mean-square error $\epsilon_{im}$ by taking into account all members of the new band $N_{abc}$ and compare it with the mean-square error $\epsilon_m$ of the initial band $B_{abc}$. If $\epsilon_{im} < \epsilon_m$, assign band $N_{abc}$ to $B_{abc}$ and jump over step 3; otherwise continue with step 3;

step 3: add anew member with coordinates $(x''_i, y'_i) = ((x_i + x_z) MOD \ c, (y_i 30 \ y_z) MOD \ c)$ to the discrete rigid band $B_{abc}$. This operation consists of displacing a cell from the upper band to the current band in order to obtain a new band $N_{abc}$. Renumber all cells inside the new band $N_{abc}$, calculate the mean-square error $\epsilon_{im}$ by taking into account all members of the new band $N_{abc}$ and compare it with the mean-square error $\epsilon_m$ of the initial band $B_{abc}$. If $\epsilon_{im} < \epsilon_m$, assign the band $N_{abc}$ to $B_{abc}$.

step 4: apply steps 1–3 to every member i of band $B_{abc}$, with coordinates $(x_i, y_i)$.

step 5: while error $\epsilon_m$ decreases, repeat step 4.

At the end of step 5, one obtains a new improved discrete band $IB_{abc}$, which may behave better than the initial discrete rigid band $B_{abc}$, according to the specified error criterion and which possesses properties P1 and P2.

Once a single rotated improved discrete band of a given rotated tile has been generated, further bands of the tile are generated as in the rigid band discrete one-to-one rotation technique by replicating this band and its associated cell numbering values.

Discrete one-to-one rotation by discrete XYX-shearing. Let us introduce another discrete one-to-one rotation technique, the method of consecutive discrete XYX-shears. It is a well-known fact that an exact (non-discrete) rotation of the Cartesian plane can be represented as three consecutive continuous (non-discrete) X-, Y- and X-shears. A continuous X-shear given by its transformation matrix $M_x$ when applied to a point (x,y) gives a point (x',y') which can be calculated as $$\begin{pmatrix} x' \\ y' \end{pmatrix} = M_X \begin{pmatrix} x \\ y \end{pmatrix} = \begin{pmatrix} 1 & k \\ 0 & 1 \end{pmatrix} \begin{pmatrix} x \\ y \end{pmatrix},$$

where k is the shearing parameter.

Similarly, a continuous Y-shear given by its transformation matrix $M_y$ when applied on a point (x,y) gives a point (x',y') which can be calculated as $$\begin{pmatrix} x' \\ y' \end{pmatrix} = M_Y \begin{pmatrix} x \\ y \end{pmatrix} = \begin{pmatrix} 1 & 0 \\ k & 1 \end{pmatrix} \begin{pmatrix} x \\ y \end{pmatrix}.$$

If the first X-shear is done by its transformation matrix $$\begin{pmatrix} 1 & k_1 \\ 0 & 1 \end{pmatrix},$$

the second Y-shear is done by its transformation matrix $$\begin{pmatrix} 1 & 0 \\ k_2 & 1 \end{pmatrix},$$

and the third X-shear is done by its transformation matrix $$\begin{pmatrix} 1 & k_3 \\ 0 & 1 \end{pmatrix},$$

their consecutive application represents a rotation by angle $\theta$ around the origin, which leads to the following equation:

$$\begin{pmatrix} 1 & k_1 \\ 0 & 1 \end{pmatrix} \begin{pmatrix} 1 & 0 \\ k_2 & 1 \end{pmatrix} \begin{pmatrix} 1 & k_3 \\ 0 & 1 \end{pmatrix} = \begin{pmatrix} \cos\theta & -\sin\theta \\ \sin\theta & \cos\theta \end{pmatrix} \quad (19)$$

Solving the equation (19), we obtain the unknown parameters $k_1$, $k_2$ and $k_3$ of X-, Y- and X-shears:

$$k_1 = k_3 = -\frac{\sin\theta}{1 + \cos\theta} = -\tan(\theta/2); \quad k_2 = \sin\theta;$$

Now, let us introduce a discrete X-shear given by the same transformation matrix as the continuous X-shear, with the same shearing parameter $k_1$. The discrete X-shear is defined as $$\begin{pmatrix} x'' \\ y'' \end{pmatrix} = F_I \left( M_X \begin{pmatrix} x \\ y \end{pmatrix} \right) = F_I \left( \begin{pmatrix} 1 & k \\ 0 & 1 \end{pmatrix} \begin{pmatrix} x \\ y \end{pmatrix} \right) \quad (20)$$

where $F_I$ is any discretization function like floor, ceiling or round. It is obvious that the discrete X-shear defined in (20) is a discrete one-to-one transformation. Similarly, the discrete Y-shear is defined as $$\begin{pmatrix} x'' \\ y'' \end{pmatrix} = F_I \left( M_Y \begin{pmatrix} x \\ y \end{pmatrix} \right) = F_I \left( \begin{pmatrix} 1 & 0 \\ k & 1 \end{pmatrix} \begin{pmatrix} x \\ y \end{pmatrix} \right). \quad (21)$$

When the round function is used in place of $F_I$, for the case of a single shearing transformation, a maximal distance of 0.5 can separate the point (x',y') obtained by either continuous X- or Y-shear from the point (x'',y'') obtained by corresponding discrete shear. After applying three consecutive discrete X-, Y- and X-shears, the maximal error is 1.5, when compared to continuous XYX-shears. Three consecutive discrete X-, Y- and X-shears is a discrete one-to-one transformation which satisfies criterion (6) and can therefore be considered as a discrete one-to-one rotation. One-to-one rotation by discrete shearing is a fast process, since it can be implemented by applying incremental techniques known in the art.

Applying the principle of discrete rotation to produce dither threshold arrays. Applying discrete one-to-one rotations satisfying conditions (5) to (8) for displaying and printing purposes so as to produce dither layers of desired angles and periods can be described for example by the following steps:

define the desired final screening period and angle for each of the dither layers, for example according to equation (4);

define the steps for obtaining final dither tiles paving the dither plane layers by assigning as the initial screen element period the final period of the corresponding layer, by calculating for each layer the initial screen element angle $\theta_O$ from the screen element period according to techniques known in the art and by computing for each layer the discrete one-to-one rotation angle necessary to rotate the tile by an angle equal to the difference between the final and the initial screen element angles;

for each layer, in case a single discrete one-to-one rotation cannot be easily achieved, decompose the required discrete one-to-one rotation into several discrete one-to-one rotations;

For each layer:

assemble replications of the previously defined screen element into an expanded tile paving the plane of a size which enables one-to-one discrete rotation by the computed rotation angle and associate dither values with each elementary cell of this tile $w_O$, according to the chosen method for creating tiles composed of dot-clustered screen elements;

apply one or several discrete one-to-one $\tau_{\theta i}$ rotations such that the initial screen angle $\theta_O$ and the sum of rotation angles $\theta_i$ equals the desired final angle. Assign, at each rotation $\tau_{\theta i}$, the threshold values of cells $w_{i-1} \in \mathbb{Z}^2$ to the cells obtained through rotation $w_i = \tau_{\theta i}(w_{i-}) \in \mathbb{Z}^2$. After each rotation step, a dither tile paving the plane may have to be replaced by techniques known in the art by an equivalent dither tile paving the plane and having a size enabling the next discrete one-to-one rotation step. If the space covered by one tile is not sufficient for the next rotation step, enlarge that space by appropriately replicating that tile;

generate from the resulting rotated dither tile a scanning dither array, or to spare memory, a reduced scanning dither array;

scan in parallel the output image pixmap, the scanning dither array containing the threshold values and the input image array, compare input image intensifies and threshold values, assign according to said comparisons one of two possible intensity values to the output image pixels and send output image pixel values to the output image pixmap.

Preferred embodiments and examples of the discrete one-to-one rotation method. The following description gives an example of concrete applications of the discrete one-to-one rotation method. As mentioned above, in the four-color reproduction process, only three separate dithered color layers (cyan, magenta and black) out of four (cyan, magenta, black and yellow) are taken into account when tuning their orientations and frequencies. For the fourth separate dithered color layer, the yellow layer, the restrictions about relationships with the three other layers are much less stringent; therefore, it is possible not to take into account the fourth layer in the present examples without any loss of generality.

The three separate dithered color layers are assigned to the three separate color planes: the cyan, magenta and black planes. Only the relative orientations of the frequencies are important, not their absolute values. That is why, in the following examples, the three layers under discussion will be labeled "#1", "#2" and "#3" knowing that layer #1 corresponds to one of the colors in the {cyan, magenta, black} set, layer #2 corresponds to another color in the same set and layer #3 corresponds to a third color in the same set.

The first application example of the discrete one-to-one rotation method is related to obtaining conventional dither angle differences for dithered layers #1, #2 and #3. More precisely, for dithered layers #1, #2 and #3, the dither frequency must be identical, and the differences in orientation of layers #2 and #3 compared to layer #1 must respectively equal 30° and 60°.

This solution can be obtained for example as follows:
layer #1 is obtained by producing an initial tile composed of an integer number of screen elements, each one being of size 5×5 and having an initial angle of 0°.
layers #2 and #3 are obtained by applying the discrete one-to-one rotation to the expanded dither tile, using as a basis the initial dither tile produced for layer #1. The discrete one-to-one rotation variant used in this example is the rigid band method.

The basic parameters of the screen element composing the dither tile as well as the parameters of the discrete one-to-one rotation by rigid bands are given, as an example, in the following table:

| layer | $dx_1$ | $dy_1$ | $dx_2$ | $dy_2$ | a | b | c | $d\theta$ (deg) | $\theta$ (deg) |
|---|---|---|---|---|---|---|---|---|---|
| #1 | 5 | 0 | 0 | 5 | — | — | — | — | 0 |
| #2 | 5 | 0 | 0 | 5 | 780 | 451 | 901 | 30.0367 | 30.0367 |
| #3 | 5 | 0 | 0 | 5 | 780 | −451 | 901 | −30.0367 | −30.0367 |

Figure 5:
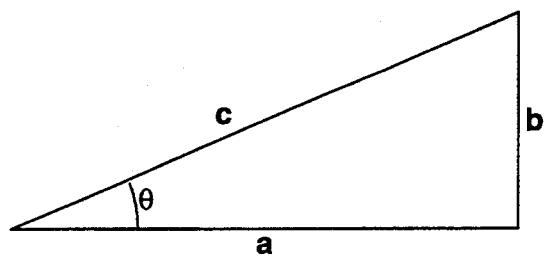
FIG. 5 shows an example of the parameters defining discrete one-to-one rotations in the plane.
Figure 6:
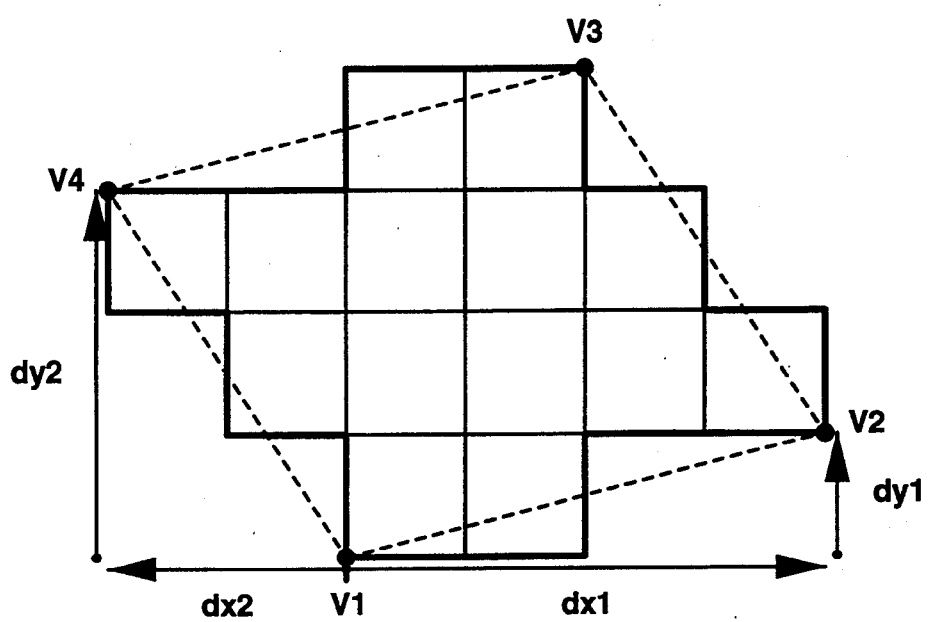
FIG. 6 shows an example of a screen element defined by its orientation parameters dx1, dy1, dx2, dy2.

In this and in the following tables, the basic parameters $dx_1$, $dy_1$, $dx_2$ and $dy_2$ of the screen elements composing the initial and expanded tiles are those of FIG. 6; the basic parameters a, b and c of the discrete one-to-one rotation are those of FIG. 5; $d\theta$ is the rotation angle associated with the corresponding one-to-one rotation step and $\theta$ the cumulated current screen angle.

The second application example of the disclosed technique also makes it possible to obtain conventional dither angle differences for dithered layers #1, #2 and #3. The difference with the first example is that four discrete one-to-one rotations (small angle one-to-one rotation variant) are used to obtain layers #2 and #3. The basic parameters of the initial tile as well as the parameters for the four discrete small angle one-to-one rotations are shown in the following table:

| layer | $dx_1$ | $dy_1$ | $dx_2$ | $dy_2$ | a | b | c | $d\theta$ (deg) | $\theta$ (deg) |
|---|---|---|---|---|---|---|---|---|---|
| #1 | 4 | 1 | −1 | 4 | — | — | — | — | 14.0362 |
| #2 | 4 | 1 | −1 | 4 | | | | | 14.0362 |
| | | | | | 480 | −31 | 481 | −3.69522 | 10.341 |
| | | | | | 1200 | −49 | 1201 | −2.33828 | 8.0027 |
| | | | | | 9384 | −137 | 9385 | −0.83642 | 7.16632 |
| | | | | | 4 | 3 | 5 | 36.870 | 44.0363 |
| #3 | 4 | 1 | −1 | 4 | | | | | 14.0362 |
| | | | | | 480 | 31 | 481 | 3.69522 | 17.7314 |
| | | | | | 1200 | 49 | 1201 | 2.33828 | 20.0697 |
| | | | | | 9384 | 137 | 9385 | 0.83642 | 20.9061 |
| | | | | | 4 | −3 | 5 | −36.870 | −15.9639 |

The third application example of the disclosed technique makes it possible to obtain for dithered layers #1, #2 and #3 a combination of angles and orientations which satisfies the afore-mentioned Moiré minimization criterion (4). The basic parameters of the initial tile as well as the parameters of the two discrete small angle one-to-one rotations are shown in the following table:

| layer | $dx_1$ | $dy_1$ | $dx_2$ | $dy_2$ | a | b | c | $d\theta$ (deg) | $\theta$ (deg) |
|---|---|---|---|---|---|---|---|---|---|
| #1 | 3 | 3 | −3 | 3 | — | — | — | — | 18.4349 |
| #2 | 4 | 1 | −1 | 4 | | | | | 14.0362 |
| | | | | | 22260 | 211 | 22261 | 0.543084 | 14.5793 |
| | | | | | 3612 | 85 | 3613 | 1.34807 | 15.9274 |
| #3 | 1 | 4 | −4 | 1 | | | | | 75.9638 |
| | | | | | 22260 | −211 | 22261 | −0.543084 | 75.4207 |
| | | | | | 3612 | −85 | 3613 | −1.34807 | 74.0726 |

The exact value of the desired rotation angle for layers #2 and #3 can be obtained by applying criterion (4) to rotate initial frequency location vectors $\vec{Q}_1$, $\vec{Q}_2$ and $\vec{Q}_3$, where $\|\vec{Q}_1\| = 1/\sqrt{3^2+3^2}$; $\theta_1=45°$; $\|\vec{Q}_2\| = 1/\sqrt{4^2+1^2}$; $\|\vec{Q}_3\| = 1/\sqrt{1^2+4^2}$.

The exact solution of equation (4) gives the final angles for the layers #2 and #3:

$$\theta_2 = \arctan\left(\frac{19}{36 + \sqrt{935}}\right)$$

$$\theta_3 = \arctan\left(\frac{36 + \sqrt{935}}{19}\right).$$

Therefore, the exact value of the required rotation angles for layers #2 and #3 is $$d\theta_2 = \arctan\left(\frac{19}{36 + \sqrt{935}}\right) - \arctan\left(\frac{1}{4}\right) \approx 1.89147°$$

$$d\theta_3 = \arctan\left(\frac{36 + \sqrt{935}}{19}\right) - \arctan\left(\frac{4}{1}\right) \approx -1.89147°.$$

Thus, thanks to the two small angle one-to-one rotations of layers #2 and #3, it is possible to obtain, with very great precision, a combination of angles and frequencies minimizing the undesirable Moiré effect.

The fourth example is quite similar to the previous one, but it is applied to layers #1, #2 and #3 having other basic parameters, as shown in the following table:

| layer | $dx_1$ | $dy_1$ | $dx_2$ | $dy_2$ | a | b | c | $d\theta$ (deg) | $\theta$ (deg) |
|---|---|---|---|---|---|---|---|---|---|
| #1 | 2 | 2 | −2 | 2 | — | — | — | — | 45 |
| #2 | 3 | 1 | −1 | 3 | | | | | 18.4349 |
| | | | | | 420 | −29 | 421 | −3.94987 | 14.4851 |
| | | | | | 544 | −33 | 545 | −3.47141 | 11.0137 |
| #3 | 1 | 3 | −3 | 1 | | | | | 71.5651 |
| | | | | | 420 | 29 | 421 | 3.94987 | 75.5149 |
| | | | | | 544 | 33 | 545 | 3.47141 | 78.9863 |

The exact value of the desired rotation angle for layers #2 and #3 can be obtained by applying criterion (4) to rotate initial frequency location vectors $\vec{Q}_1$, $\vec{Q}_2$ and $\vec{Q}_3$, where $\|\vec{Q}_1\| = 1/\sqrt{2^2 + 2^2}$; $\theta_1 = 45°$; $\|\vec{Q}_2\| = 1/\sqrt{3^2 + 1^2}$; $\|\vec{Q}_3\| = 1/\sqrt{1^2 + 3^2}$.

The exact solution of equation (4) gives the final angles for the layers #2 and #3:

$$\theta_2 = \arctan\left(\frac{3}{8 + \sqrt{55}}\right)$$

$$\theta_3 = \arctan\left(\frac{8 + \sqrt{55}}{3}\right)$$

Therefore, the exact value of the required rotation angles for layers #2 and #3 is $$d\theta_2 = \arctan\left(\frac{3}{8 + \sqrt{55}}\right) - \arctan\left(\frac{1}{3}\right) \approx -7.42279°$$

$$d\theta_3 = \arctan\left(\frac{8 + \sqrt{55}}{3}\right) - \arctan\left(\frac{3}{1}\right) \approx 7.42279°.$$

As in the previous example, thanks to two discrete small angle one-to-one rotations of layers #2 and #3, it is possible to obtain, with very great precision, a combination of angles and frequencies minimizing the Moiré effect.

In all examples shown above, the Moiré effect is being minimized and both the number of elementary cells per screen element and their respective dither threshold values remain constant throughout the discrete one-to-one rotation process. These properties, which are unique to the present invention enable clustered-dot colour reproductions to be produced at low and medium resolution with a much better quality than methods of the previous art.

Apparatus. An apparatus according to an embodiment of the present disclosure, as shown in FIG. 11, comprises computing and storage means (90) for generating rotated dither tiles according to the proposed discrete one-to-one rotation method and for constructing conventional dither threshold arrays or scanning dither arrays from the rotated dither tiles paving the plane according to the invented method.

The colour input image is read by means of an input device (91) and stored in the memory of the apparatus (92). The input means also provides information about the desired final angles and periods. The computing means computes screen element periods, initial screen element angles, and the discrete one-to-one rotation angle to reach the final angle. After having analyzed the range of discrete one-to-one rotation solutions, the computing means may decide to subdivide the discrete one-to-one rotation into several discrete one-to-one rotations. The computing means builds an initial tile composed of said screen elements and extends it in order to obtain a size enabling discrete one-to-one rotation by the selected angle. The computing means rotates said tile, after each rotation possibly replacing the resulting tile by an equivalent tile. The computing means constructs a conventional dither threshold array or a scanning dither threshold array according to the present invention from the last tile obtained by discrete one-to-one rotation. The comparing unit (93) scans the output image pixmap, the dither array or the scanning dither array, as well as the input image array, fetches dither threshold values from the dither array and image intensity values from the input image array, compares said image intensity values to threshold values, decides which of two predefined intensity levels should be attributed to the output image pixel and writes the output image pixel to an output image pixmap (94). The output image pixmap of the apparatus has the task of sending the output pixels to the output device (95).

What we claim is:

1. A method for producing halftone image separations for colour reproduction minimizing Moiré effects, where a final screening angle and period is computed for each of a plurality of dither layers so as to minimize Moiré effects, wherein the improvement comprises the application of a discrete one-to-one rotation in order to reach the final screening angle, said rotation being a one-to-one mapping of the elementary cell grid into itself, the method comprising for each of the dither layers the steps of:

a) defining initial screen element and discrete one-to-one rotation parameters, said definitions comprising an initial screen element period equal to the final screening period of the corresponding layer, an initial screen element angle computed from the screening period and a discrete one-to-one dither tile rotation to reach the final screening screening angle, where the discrete one-to-one rotation angle is computed so as to rotate the tile by an angle equal to the difference between the final screen angle and the initial screen element angle;

b) generating an expanded dither tile paving the plane and containing the screen elements defined in the previous step, said expanded dither tile being characterized by its tile period which is an integer multiple of the size of the hypothenuse of the Pythagorean triangle defining the discrete one-to-one dither tile rotation;

c) applying said discrete one-to-one dither tile rotation to the expanded dither tile so as to rotate it by the rotation angle computed in step (a);

d) constructing a dither array from the resulting dither tile;

e) generating a halftoned output image pixmap from an input image array by scanning the output image pixmap pixel by pixel and scanline by scanline, simultaneously scanning the dither array to obtain the corresponding threshold values and scanning the input image array to obtain the corresponding image intensity values, comparing said image intensity values to said threshold values and, according to the result of the comparison, writing pixels having one of two possible intensity levels to the output image pixmap.

2. The method defined in claim 1, where final screen angles and periods are computed by applying a Moiré minimization criterion stating that the sum of the screen element's frequency location vectors in the frequency domain has to be equal to zero.

3. The method defined in claim 1, wherein a further improvement comprises the replacement of the dither array by a scanning dither array, said improved scanning dither array being an array containing both dither threshold values and displacement vectors which are used during the scanning process associated with halftoned output image pixmap generation.

4. The method defined in claim 1, where the defined discrete one-to-one dither tile rotation is decomposed into several discrete one-to-one dither tile rotation steps, requiting for each new discrete one-to-one dither tile rotation the possible replacement of the current tile by another equivalent tile of a size enabling the discrete one-to-one rotation step and paving the plane.

5. The method defined in claim 1, where discrete one-to-one rotation comprises small angle rotation, wherein small angle rotation is characterized by the application of geometric rotation and rounding to cells of the expanded dither tile, said geometric rotation being limited to angles defined by a Pythagorean triangle of long cathet a, short cathet b and hypothenuse c, where $c=a+1$ and where a, b and c are integer numbers.

6. The method defined in claim 1, where discrete one-to-one rotation comprises rigid band rotation, wherein rigid band rotation is limited to rational rotation angles and comprises the following characteristic steps:

rotation of a unit-wide band of length l, where l is an integer multiple of hypothenuse c of the Pythagorean triangle associated with rotation angle $\theta$, selection and numbering of cells inside the rotated band, copy of threshold values from cells of the non-rotated band to cells of the rotated band, and replication of the so obtained rotated discrete band in order to produce the rotated tile.

7. The method defined in claim 1, where discrete one-to-one rotation comprises improved band rotation, wherein improved band rotation is an improved version of rigid band rotation, said improved band rotation being limited to rational rotation angles and comprising the following characteristic steps:

rotation of a unit-wide band of length l, where l is an integer multiple of hypothenuse c of the Pythagorean triangle associated with rotation angle $\theta$, selection and numbering of cells inside the rotated band, successive exchange of cells with corresponding cells from neighbouring bands thereby trying to improve a given error criterion such as for example the mean square error between improved band discrete one-to-one rotation and continuous geometric rotation of cell centers, copy of threshold values from cells of the non-rotated band to cells of the rotated band, and replication of the so obtained rotated discrete band in order to produce the rotated tile.

8. The method defined in claim 1, where discrete one-to-one rotation comprises discrete XYX-shearing, wherein XYX-shearing is characterized by a succession of 3 discrete shearing transformations, each discrete shearing transformation comprising a continuous shearing transformation and a discretization function.

9. The method defined in claim 1, where discrete one-to-one rotation is realized by the combination of the techniques comprising: small angle rotation, rigid band rotation, improved band rotation and discrete XYX-shearing, wherein small angle rotation, is characterized by the application of geometric rotation and rounding to cells of the expanded dither tile, said geometric rotation being limited to angles defined by Pythagorean triangle of integer cathets a and b and integer hypothenuse c, where $c=a+1$ or $c=b+1$, wherein rigid band rotation is characterized by the rotation of a unit-wide band of length l, where l is an integer multiple of hypothenuse c of the Pythagorean triangle associated with rotation angle $\theta$, by the selection and numbering of cells inside the rotated band, by the copy of threshold values from cells of the non-rotated band to cells of the rotated band and by the replication of the so obtained rotated discrete band in order to produce the rotated tile, wherein improved band rotation is characterized by the rotation of a unit-wide band of length l, where l is an integer multiple of integer hypothenuse c of the Pythagorean triangle associated with rotation angle $\theta$, by the selection and numbering of cells inside the rotated band, by successive exchange of given cells with corresponding cells from neighbouring bands thereby trying to improve a given error criterion such as for example the mean square error between improved band rotation and continuous geometric rotation of cell centers,
wherein XYX-shearing is characterized by a succession of 3 discrete shearing transformations, each discrete shearing transformation comprising a continuous shearing transformation and a discretization function.

10. The method defined in claim 3, where a scanning dither array is replaced by its reduced equivalent which is a reduced scanning dither array containing all threshold and displacement vector information of the initial scanning dither array and an additional positioning vector specifying for each row of the reduced scanning dither array the location of its first element in the initial scanning dither array.

11. An apparatus for generating color halftone images operable for executing methods of claim 1, said apparatus comprises:
   a) an input device;
   b) a dither array storage means;
   c) a processing means;
   d) a comparing unit;
   e) an output image pixmap; and
   f) an output device;
      said input device operable for receiving and storing an image in the form of an array of intensity levels and for receiving information about desired final angles and periods;
      said dither array storage means operable for storing a dither array;
      said processing means operable for defining screen element period and angles, selecting discrete one-to-one rotations, building an initial tile composed of said screen elements, rotating said tile by said discrete one-to-one rotations, replacing after each rotation the resulting tile by an equivalent tile, constructing the dither array from the resulting tile, storing said dither array;
      said comparing unit operable for scanning the output image pixmap, the dither array and the input image array, fetching dither threshold values from the dither array and image intensity values from the input image array, comparing said image intensity values to said dither threshold values, deciding which of the two predefined intensity levels should be attributed to the output image pixel, writing said output image pixel to the output pixmap; and
      said output image pixmap being operable for sending output pixels to the output device.

12. The apparatus defined in claim 11, where the dither array storage means is more specifically a scanning dither threshold array storage means, said scanning dither array storage means storing both dither threshold values and displacement vectors.

13. The apparatus defined in claim 12, where the scanning dither array storage means is reduced to a reduced scanning dither array storage means containing equivalent threshold and displacement vector information and an additional positioning vector specifying for each row of the reduced scanning dither array the location of its first element in the initial scanning dither array.

14. An apparatus for generating color halftone images operable for executing a one-to-one rotation of dither matrix cells, said apparatus comprising:
   a) an input device;
   b) a dither array storage means;
   c) a processing means;
   d) a comparing unit;
   e) an output image pixmap; and
   f) an output device;
      said input device operable for receiving and storing an image in the form of an array of intensity levels and for receiving information about desired final angles and periods;
      said dither array storage means operable for storing a dither array;
      said processing means operable for defining screen element period and angles, selecting discrete one-to-one rotations, building an initial tile composed of said screen elements, rotating said tile by said discrete one-to-one rotations, replacing after each rotation the resulting tile by an equivalent tile, constructing the dither array from the resulting tile, storing said dither array;
      said comparing unit operable for scanning the output image pixmap, the dither array and the input image array, fetching dither threshold values from the dither array and image intensity values from the input image array, comparing said image intensity values to said dither threshold values, deciding which of the two predefined intensity levels should be attributed to the output image pixel, writing said output image pixel to the output pixmap; and
      said output image pixmap being operable for sending output pixels to the output device.

15. The apparatus of claim 14, where the dither array storage means is more specifically a scanning dither threshold array storage means, said scanning dither array storage means storing both dither threshold values and displacement vectors.

16. The apparatus of claim 15 where the scanning dither array storage means is reduced to a reduced scanning dither array storage means containing equivalent threshold and displacement vector information and an additional positioning vector specifying for each row of the reduced scanning dither array the location of its first element in the initial scanning dither array.

* * * * *